UNITED STATES PATENT OFFICE 2,132,155

METHOD OF MANUFACTURING A PRODUCT CONTAINING CALCIUM NITRATE AND AMMONIUM NITRATE

Stefan Julius Gelhaar, Ljungaverk, Sweden, assignor to Stockholms Superfosfat Fabriks Aktiebolag, Stockholm, Sweden, a corporation of Sweden No Drawing. Application October 26, 1936, Serial No. 107,733. In Sweden November 13, 1935

1 Claim. (Cl. 71—58)

The methods hitherto used for producing nitrocalcite (calcium nitrate) are executed in such way, that at first a solution of calcium nitrate is produced by allowing calcium carbonate and nitric acid to react on each other. This solution then is evaporated to high concentration. According to one form of execution in applying this method a salt of ammonia is added, the concentration and quantity of which is such as to assure that the amount of bound ammonia does not surpass 2%. The solution then is sprayed at high temperature and caused to fall in the form of small drops, which are thereby solidified. According to another form of execution a salt containing a monovalent metal and $NH_4$ is added in such a quantity to the solution of calcium nitrate, that the proportion between $Ca(NO_3)_2$ and the other salt, for instance $NaNO_3$, will be 5 : 1, a salt, for instance $5.Ca(NO_3)_2.NaNO_3.10H_2O$ thereby being precipitated. It is a matter of fact that all methods hitherto used for producing calcium nitrate, or compounds containing calcium nitrate, have been executed on the basis of evaporation of solutions.

According to the present invention one is proceeding solely in a solid phase, whereby evaporation is avoided. This may be executed in practice in such a way that in a mixing machine solid limestone powder is mixed with solid ammonium trinitrate, these two constituents then being allowed to react on each other until a neutral or nearly neutral product is obtained. The reaction is performed according to the following equation:

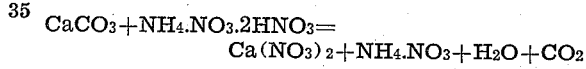
$$CaCO_3 + NH_4.NO_3.2HNO_3 = Ca(NO_3)_2 + NH_4.NO_3 + H_2O + CO_2$$

As nowadays ammonium trinitrate can be manufactured in a very simple and cheap way, this invention makes it possible to avoid any evaporation in the manufacturing of a solid product containing calcium and ammonium nitrates and which can suitably be used as a manure. Usually not even drying is necessary, as a quite dry product is obtained at once, which according to methods before known and other suitable methods can be converted into grains.

However, the reaction between the calcium carbonate and trinitrate may be hastened through heating, especially towards the end of the process. If a smaller amount of ammonia is wanted in the product obtained, one may towards the end of the reaction add some calcium oxide or calcium hydroxide or both together, by means of which a corresponding quantity of ammonia is driven off.

Theoretically the product obtained may contain 21.4% N, of which 16% is contained as nitrate. Thereby that an excess of limestone powder is added, it is possible, however, to obtain products with low amount of nitrogen, if wanted.

Instead of limestone powder it is possible to add another form of calcium carbonate, such as dolomite.

Example 9 kilos of limestone powder became intimately mixed with 16.3 kilos ammonium trinitrate in a mixing machine, whereby an hour later a quite dry, granular product was obtained, containing 20.6% N.

It is evident that not only pure calcium carbonate may be used but also minerals or other substances, containing a large quantity of calcium carbonate.

The product obtained may advantageously be used as manure.

I claim:

Method of manufacturing a product containing calcium and ammonium nitrate and adapted to be used as a nitrogen containing manure, consisting in mixing a substance which principally consists of calcium carbonate with ammonium trinitrate, both reagents being in the solid phase, heating the mixture and finally adding a calcium compound to the mixture towards the end of the reaction.

STEFAN JULIUS GELHAAR.